Dec. 4, 1928.
H. S. WALKER
UNDER FLOOR DUCT SYSTEM
Filed Aug. 26, 1926
1,693,682
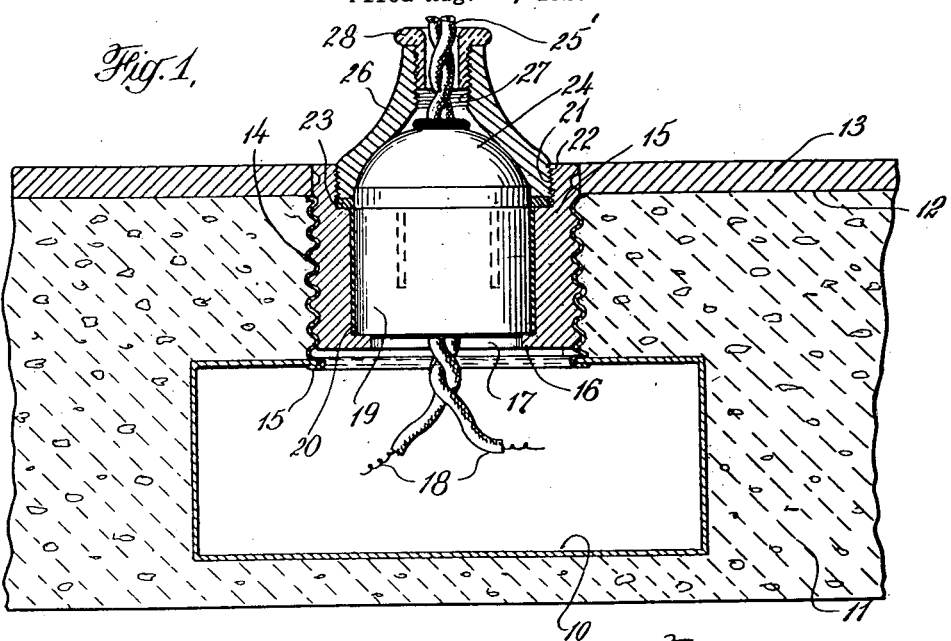
Fig. 1.
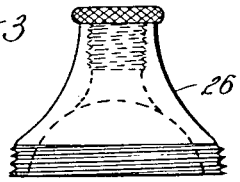
Fig. 3.
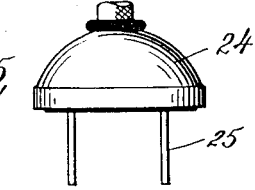
Fig. 4.
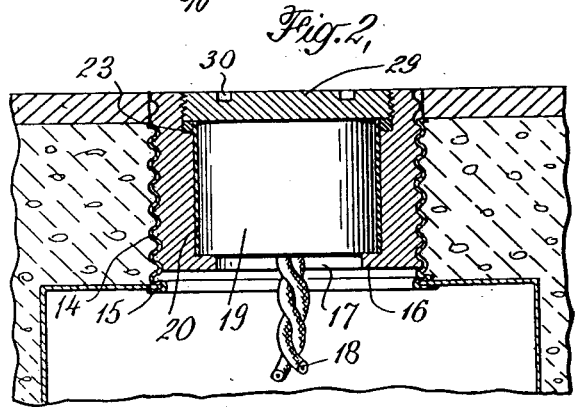
Fig. 2.
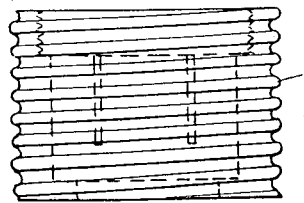
Fig. 5.
Fig. 6.
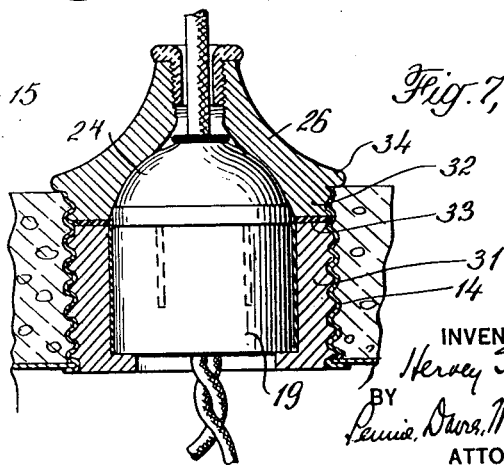
Fig. 7.
INVENTOR
Hervey S. Walker
BY
Pennie, Davis, Marvin, Edmonds
ATTORNEYS Patented Dec. 4, 1928.

1,693,682

UNITED STATES PATENT OFFICE.

HERVEY S. WALKER, OF ARDMORE, PENNSYLVANIA.

UNDERFLOOR DUCT SYSTEM.

Application filed August 26, 1926. Serial No. 131,574.

This invention relates to underfloor wiring systems of the type now commonly installed in modern buildings of reinforced concrete construction used for offices and other similar purposes. More particularly, the invention is concerned with an improved floor outlet for use in these systems, the outlet being arranged for installation as a permanent part of the system but being capable of demounting so that no parts of it project above the floor or are visible, when it is not in use.

In modern buildings for office purposes, present wiring practice involves providing conduits or ducts for the electrical conductors at an intermediate level of the floor during construction of the latter. These conduits are wholly enclosed and concealed in the floor material and wherever outlets for the conductors are required, fittings are mounted in the conduit wall. According to one method, fittings are placed in position, in so far as the desired locations are known, before the floor is completed, these fittings extending through the floor to terminate flush with the finished floor surface. Additional outlets are then provided after the floor is completed by cutting into the floor to expose the conduit at the desired point and a fitting is then introduced in the conduit wall and the floor patched. According to a more recent method, the conduit is provided with outlet fittings in the form of tubular inserts which are mounted in the conduit at definite uniform intervals prior to its installation of the floor, these inserts being disposed at such a spacing that there will always be an outlet conveniently placed wherever a connection must be made. These inserts terminate flush with the floor and such of them as are not in use are closed by caps. This system is an improvement over the one previously described since it is highly flexible in use, connections to it may be made without mutilating the floor and the inserts employed may be of relatively cheap construction and much less expensive than the fittings heretofore used in systems of this kind.

With either system, it has been customary to employ standpipes which are placed in the ends of the fittings to close the latter and to protect the wires issuing therefrom. These standpipes extend a few inches above the floor surface and in many instances carry wiring receptacles provided with terminals to which the conductors in the conduit are permanently connected. These receptacles have a removable part to which the wires leading to the device to be supplied with current are connected, this arrangement permitting the device to be connected to any convenient standpipe. In using such standpipes, connections are made to the wires within the conduit, then the wires are led through the outlet fitting and to the part of the receptacle which is mounted in the standpipe and are then connected to the terminals of the receptacle. The standpipes remain in the ends of the fittings at all times and cannot be removed without disconnecting the wires which lead to the conductors in the conduit.

This arrangement is satisfactory for many purposes but in some installations, it is undesirable to have the standpipes in place when they are not in use, and their removal necessitates breaking electrical connections and usually requires the services of a skilled electrician. The present invention is, accordingly, directed to the provision of an outlet fitting which may be installed as a permanent part of a concealed or underfloor wiring system, which affords all the advantages of the ordinary standpipe, and which may be entirely concealed with no parts projecting above the floor surface when the receptacle is not in use. The receptacle is further arranged so that when once connected to the wires within the conduit, no change is necessary in the permanent electrical connections within the device either to make a connection to some device on the floor which requires current or to disconnect the device and place in position certain parts which conceal the receptacle.

The preferred form of embodiment of the invention is one in which the outlet is used with the system which has tubular inserts permanently mounted in the conduit wall and these inserts, which are made of thin metal, are rolled so as to provide them with a thread. Into the threaded inserts which terminate flush with the floor level but below the level of the floor covering, is threaded a bushing which has an internal flange at its lower end. The receptacle is then introduced into this bushing, the bushing being adjusted so that its upper face lies flush with the floor covering, such as linoleum for example. Formed in the upper face of the bushing is a channel which has a greater diameter than the diameter of that part in which the receptacle is mounted and into this channel may be inserted a plate which lies flush with the floor and completely conceals the receptacle. When the connection is to be made, this plate is removed and the plug for the receptacle is inserted in place in the receptacle which lies within the bushing. A suitable hood member is now fitted into the channel to enclose and protect the plug. With this arrangement the wires which lead from the receptacle are protected by their passage through the hood member and are exposed only some distance above the floor so that the ordinary advantages of the standpipe in protecting the wires are secured. When the connection is no longer desired, the hood member is removed, the plug disengaged from the receptacle and the cover plate fitted into the bushing. This cover plate lies flush with the floor and its presence is therefore unobjectionable.

It will be apparent that with this arrangement the wiring receptacle which has terminals connected to the wires within the conduit is a permanent part of the wiring system and a connection may be made or discontinued at any insert without the necessity of disconnecting wires and reconnecting them.

For better understanding of the invention reference will be made to the accompanying drawing in which Fig. 1 is a view in vertical section and partly in elevation showing the device, installed in the floor and with a connection to an energy-consuming device in position, Fig. 2 is a similar view but with the connection discontinued and the floor plate in position, Fig. 3 is a view in side elevation of the hood member, Fig. 4 is a sectional view of a gasket used in the device, Fig. 5 is a view in side elevation of the removable part of the receptacle, Fig. 6 is a view in side elevation of the bushing, Fig. 7 is a view in vertical section and partly in elevation of a modified form of the invention.

Referring now to the drawing, the wiring system includes a conduit or duct 10 here illustrated as being made of thin sheet steel and of rectangular section. Any other form of duct may be used, however, without impairing the utility of the invention. This duct 10 is placed within the floor 11 during the construction of the latter at a suitable distance below the finished floor level 12, the latter ordinarily being covered by a floor covering 13 such as linoleum. At suitable points, the duct 10 is provided with outlet fittings or inserts 14 here illustrated as short tubular members of metal crimped as at 15 into openings in the upper wall of the conduit. These inserts may be made with walls of uniform diameter but are preferably rolled so as to have the threaded section illustrated.

Threaded into each insert is a bushing 15 which has an internal flange 16 defining an opening 17. Through this opening are drawn the wires 18 which are connected to conductors within the conduit and lead to the usual terminals in one part 19 of a standard wiring receptacle. A cylindrical insulating member 20 is preferably placed in position in the bushing before the receptacle 19 is introduced into it and when the receptacle is in place it is supported at its lower end on the flange 16. The bushing has a channel 21 formed in its upper face, which is of slightly greater diameter than that part of the bushing in which the wiring receptacle is received and the channel is formed with a thread 22 in its side wall. Lying in the bottom of the channel is a gasket 23 of suitable packing material and the plug 24 which is provided with the usual contact tongues 25 may be placed in position with the tongues received in the usual slots in the receptacle 19. The plug 24 is provided with terminals for wires 25 which lead to an energy-consuming device. When the removable plug has been placed in position, a hood member 26 having a peripheral thread in its lower end is threaded into the channel 21 and is turned downwardly until it contacts firmly with the gasket. The hooded member has an opening 27 at its upper end in which is threaded a protective insulating bushing 28 which prevents chafing of the wires.

It will be seen that with this arrangement all the usual advantages of the stand pipe are secured for the conductors leading to the energy-consuming device are protected for a slight distance above the floor and the opening at the floor level is made water-tight. This result is secured by making use of the gasket 23 and the external threads of the bushing are red-leaded before it is screwed into the insert. In addition, the connections to the receptacle may remain in position at all times but when the energy consuming device is moved to a different location, the hood member and the plug may be removed and a threaded floor plate 29 placed in position in the channel. This floor plate lies flush with the surface of the linoleum and completely seals the insert as well as protects the end of the receptacle. The plate is provided with recesses 30 into which a tool may be inserted for its ready removal and when connection is again to be made, the floor plate 29 is removed, the plug 24 placed in position and the hood member placed over it. With this construction of the fitting, no parts project above the floor at any insert where no connection is made but when the connection is established, the parts employed afford all the advantages of the ordinary standpipe.

In the construction illustrated in Fig. 7, the insert 14 is similar to that previously employed but the bushing 31 is of less height and is not provided with a channel similar to the channel 21. The receptacle 19 is the same as that previously employed while the hood member has a threaded portion 32 which may be threaded into that part of the insert which projects above the top of the bushing. A flat gasket 33 is again employed between the top of the bushing and the hood member and the latter may have a projecting flange 34 overlying the floor surface at the top of the insert. This modified form of the invention is used in the same manner as that shown in Fig. 1.

It will be seen that with the new outlet device, each insert may be wired at the time the system is installed, and when the connections are once made to the receptacle which is placed in the end of the insert, a connection to a machine or electric lamp or the like may be readily made at any insert and this connection does not require the services of an electrician. When such a connection is in use, the receptacle is protected by a cap member in the form of the hood and the insert is water tight. Likewise, when the connection is discontinued, the end of part of the receptacle lying within the insert is protected by the cap member in the form of the floor plate, and this plate also seals the insert and makes it water-tight. The new device therefore provides the greatest convenience and renders the wiring system highly flexible in use without the necessity of having projecting parts which are not in use extending above the floor surface at places where their presence is frequently undesirable.

The wiring receptacles and plugs are preferably the standard commercial products, and the plugs are insertable interchangeably in any receptacle, so that connections to devices requiring current may readily be made at any point in the system simply by inserting the plug connected to the device in the receptacle in the outlet fitting at that point.

I claim:

1. In an under floor wiring system, the combination of ducts within the floor below the surface thereof, outlet fittings mounted in the duct wall and extending to the floor surface, similar wiring receptacles mounted in certain of the outlet fittings and connected to electric service conductors in the duct, and a plug connectible to a device requiring current and adapted to be received interchangeably in the several receptacles.

2. In an underfloor wiring system, the combination of ducts within the floor below the surface thereof, outlet fittings mounted in the duct wall and extending to the floor surface, similar wiring receptacles mounted in certain of the outlet fittings and connected to electric service conductors in the duct, said receptacles lying in the fittings between the ends thereof, and a plug connectible to a device requiring current and adapted to be received interchangeably in the several receptacles.

3. In an underfloor wiring system, the combination of ducts within the floor below the surface thereof, outlet fittings mounted in the duct wall and extending to the floor surface, similar wiring receptacles mounted in certain of the outlet fittings and connected to electric service conductors in the duct, a plug connectible by wires to a device requiring current and adapted to be received interchangeably in the several receptacles to connect said device electrically to the conductors leading to the receptacles, and a cap member adapted to be mounted interchangeably in the outlet fittings to protect a plug inserted therein.

4. In an underfloor wiring system, the combination of ducts within the floor below the surface thereof, outlet fittings mounted in the duct wall and extending to the floor surface, similar wiring receptacles mounted in certain of the outlet fittings and connected to electric service conductors in the duct, a plug connectible by wires to a device requiring current and adapted to be received interchangeably in the several receptacles to connect said device electrically to the conductors leading to the receptacles, closure members adapted to be mounted inter-changeably in the outlet fittings to conceal and protect the receptacles not in use, and a cap member adapted to be mounted in each receptacle in use to enclose and protect the plug mounted therein.

5. In an underfloor wiring system the combination of a duct within the floor below the surface thereof, outlet fittings mounted in the duct wall and extending to the floor surface, similar wiring receptacles mounted in selected outlet fittings and connected to electric service wires in the duct, a plug connectible to a device requiring current and adapted to be inserted interchangeably in the receptacles to connect said device electrically to the wires connected to the receptacles, closure members adapted to be mounted interchangeably in the outlet fittings to conceal and protect receptacles not in use, said members when in place lying substantially flush with the finished floor surface, and a cap member adapted to be mounted in an outlet fitting in which a plug is inserted, said cap member enclosing and protecting the plug and extending above the floor surface a distance sufficient to protect the duct and connection against the entrance of moisture.

6. In an underfloor wiring system, the combination of a duct within the floor below the surface thereof, outlet fittings mounted in the duct wall and extending to the floor surface, similar wiring receptacles mounted interchangeably in selected outlet fittings and lying between the ends thereof, substantially flush with the upper ends of the fittings in which placed, and each receptacle being connected to electric service wires in the duct, a plug connectible to a device requiring current and insertable interchangeably in any receptacle to connect said device electrically to the wires to which the receptacle is connected, and closure members adapted to be mounted interchangeably in the upper ends of the outlet fittings to conceal and protect the receptacles not in use, each closure member when in position in a fitting lying substantially flush with the finished floor surface.

7. In an underfloor wiring system, the combination of a duct within the floor below the surface thereof, outlet fittings mounted in the duct wall and extending to the floor surface, similar interchangeable bushings mounted in selected fittings, similar wiring receptacles mounted in said bushings, said receptacles lying spaced inwardly from the ends of the fittings and being connected to electric service wires in the duct, a plug connectible to a device requiring current and insertable in any receptacle desired to connect said device electrically through said receptacle to the wires to which the receptacle is connected, and closure plates adapted to be mounted in the ends of the outlet fittings to conceal and protect receptacles not in use, said plates when installed lying substantially flush with the finished floor surface.

In testimony whereof I affix my signature.

HERVEY S. WALKER.